M. H. SIMPSON.
Grasshopper-Catcher.

No. 198,420. Patented Dec. 18, 1877.

UNITED STATES PATENT OFFICE.

MICHAEL H. SIMPSON, OF BOSTON, MASSACHUSETTS.

IMPROVEMENT IN GRASSHOPPER-CATCHERS.

Specification forming part of Letters Patent No. 198,420, dated December 18, 1877; application filed September 26, 1877.

*To all whom it may concern:*

Figure 1:
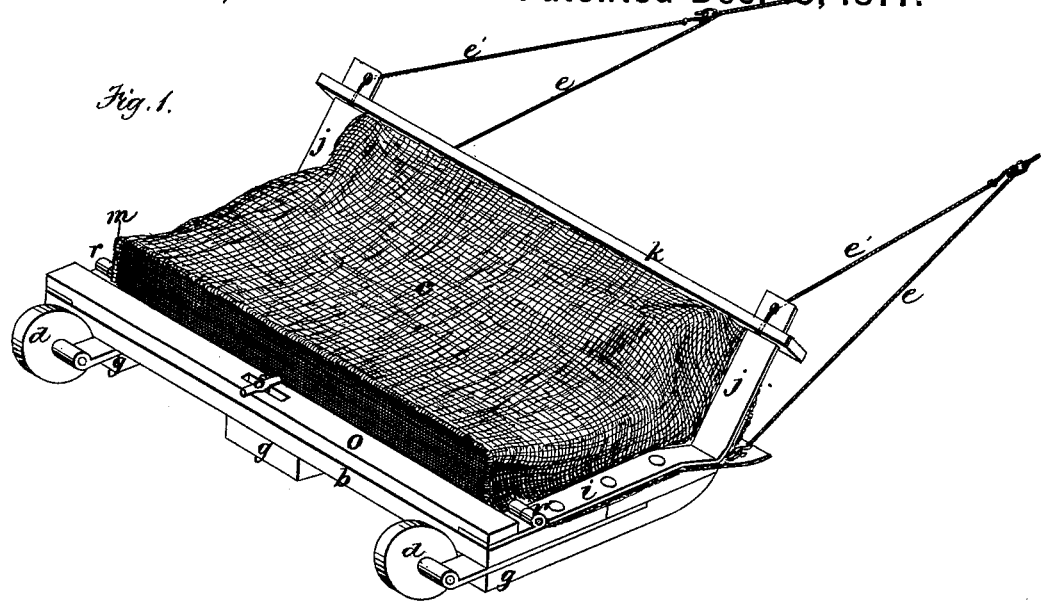
Figure 2:
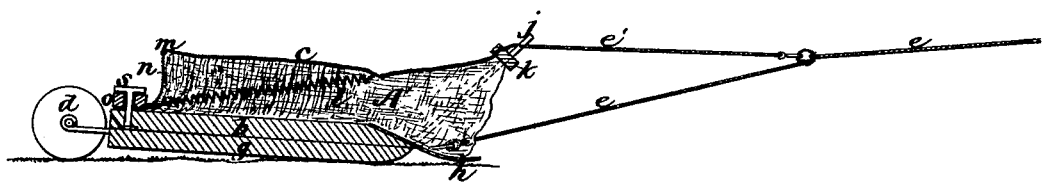
Figure 3:
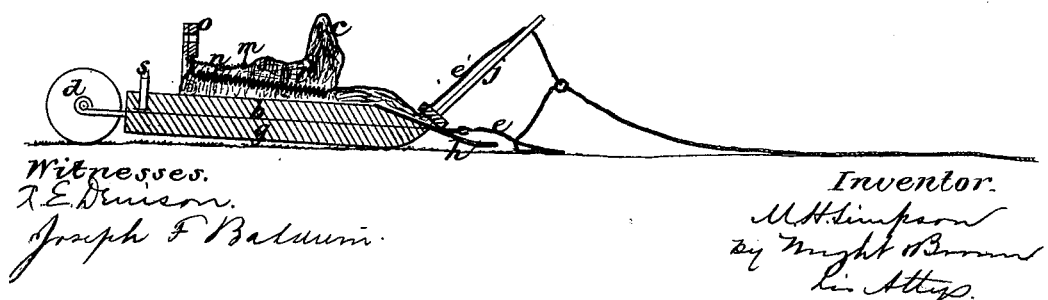

Be it known that I, MICHAEL H. SIMPSON, of Boston, in the county of Suffolk and State of Massachusetts, have invented certain Improvements in Grasshopper-Catchers, of which the following is a specification:

In the accompanying drawing, forming a part of this specification, Figure 1 represents a perspective view of my invention adapted for catching insects. Fig. 2 represents a sectional view of the same as shown in Fig. 1, and Fig. 3 represents a sectional view of the same arranged for the removal of the insects.

Similar letters of reference refer to like parts in all the figures.

This invention has for its object to provide a cheap, simple, and effective apparatus for catching or gathering grasshoppers and other insects from the surface of the ground.

The invention consists, as a whole, in a receptacle for insects, composed of a platform adapted to be drawn or propelled along the surface of the ground, and a flexible hood or cover located on said platform. The receptacle thus formed is adapted to be opened at its front, and held open by the draft which moves the apparatus, and to be automatically closed at its front when the apparatus stops; and the receptacle is adapted to be opened at its rear for the removal of the insects after they have been killed by being crushed against the platform.

The invention consists, also, in certain details of construction and combinations of parts, all of which I will now proceed to describe.

In the drawings, A represents the grasshopper catcher or receptacle, which is composed of a rigid platform, $b$, and a flexible hood or cover, $c$, located thereon. The platform $b$ is mounted on trucks $d\ d$ at its rear side, and has draft-ropes $e\ e$ attached to its forward side, said ropes being adapted for attachment to a horse. The platform is, preferably, from five to seven feet long, and is composed, preferably, of boards, making a tight flooring, and resting on transverse cleats $g\ g$, the forward ends of which are rounded and rest upon the ground. The forward side of the platform is provided with a downwardly-inclined metallic flange or scoop, $h$.

The hood or cover $c$ is composed, preferably, of coarse bagging or other textile or flexible material, and is attached firmly to the ends of the platform, preferably by means of metallic strips $i$, which are screwed to the platform, the ends of the cover being interposed between the platform and the strips $i$.

$j\ j$ represent parallel inclined standards, which are rigidly attached to the front side of the platform, and project upwardly and outwardly therefrom, the standards being, preferably, portions of the strips $i$, as shown in Fig. 1.

$k$ represents a bar, which is somewhat longer than the platform $b$, and is adapted to slide up and down on the standards $j$, the bar being provided with slots, through which the standards pass. The forward edge of the hood or cover $c$ is attached in any suitable manner to the bar $k$, so as to rise and fall with the latter. The bar $k$ is connected to the draft-ropes $e$ by short ropes $e'$, which pass through orifices in the upper ends of the standards $j$, and are so arranged that the draft which moves the apparatus will draw the bar upwardly, so that the receptacle is held open, as shown in Figs. 1 and 2, while the apparatus is in motion. When the draft ceases and the apparatus stops, the bar $k$ falls, and thus automatically closes the receptacle, as shown in Fig. 3. I prefer to employ a spring, $l$, to facilitate the descent of the bar $k$, this spring being attached at its ends, preferably, to a stationary object near the rear edge of the platform, and to the under side of the hood or cover near the forward edges thereof, as shown in Figs. 2 and 3. This spring, however, may not be necessary when the bar is sufficiently heavy to descend readily by its own weight.

It will be seen from the foregoing that when the apparatus is put in motion the front of the receptacle is automatically opened, and the grasshoppers or other insects on the surface of the field over which it is drawn are gathered or "scooped" into the receptacle.

I provide the rear side of the receptacle with a rigid frame, $m$, to which the hood $c$ is attached. This frame incloses a sheet of fine netting, $n$, which forms a reticulated barrier at the rear of the receptacle, and allows the air to pass freely through the receptacle when it is in motion, but arrests and prevents the escape of the insects.

When the horse stops, the slackening of the draft-ropes instantly allows the receptacle to close itself, as above described, thus preventing the escape of any of the insects. When a sufficient number of insects have been caught, they may be killed by stamping or moving a roller upon the hood or cover, or otherwise crushing them against the platform.

To enable the rear side of the receptacle to be opened for the removal of the dead insects, I attach the frame $m$ and the netting it contains to a bar, $o$, which is connected to the platform $b$ by hinges $r\,r$, and is adapted to be raised, as shown in Fig. 3, thus allowing the insects to be scraped or dumped out. The bar $o$ is secured to the platform when in place by a button or other suitable device, $s$.

The apparatus thus constructed enables a large quantity of insects to be caught in a short time, under favorable conditions, and the combination of the rigid platform and flexible hood or cover enables the insects to be killed by crushing before they are removed from the machine, or by scalding, the hood allowing hot water to pass freely through it.

The apparatus may be arranged to be propelled from the rear, in which case the means for opening and closing the front of the receptacle will necessarily be changed.

I claim as my invention—

1. In a grasshopper-catcher, the combination of a solid rigid platform, $b$, drawn along the surface of the ground, and forming a support on which to crush insects, and the flexible hood or cover, unobstructed from above, and connected to the top of the platform, to collect and confine the insects on said platform, and allow such insects to be crushed, as set forth.

2. The combination of the flexible hood or cover $c$, the rigid platform $b$, the inclined standards $j$, rigidly attached to said platform, the bar $k$, secured to the front edge of the cover and movable upon said standards, and the ropes $e\,e'$, whereby the apparatus is moved and the bar $k$ elevated automatically, as set forth.

3. In combination with the hood or cover $c$, the bar $k$, and standards $j$, the spring $l$, to facilitate the downward movement of the bar upon the standards, as set forth.

4. In combination with the flexible hood or cover $c$ and rigid platform $b$, the hinged bar $o$, attached to and detachable from the platform, whereby an opening at the rear end of the receptacle is provided for the removal of the insects, as set forth.

In testimony whereof I have signed my name to this specification in the presence of two subscribing witnesses.

MICHAEL H. SIMPSON.

Witnesses:
 WM. BUTLER,
 SAMUEL B. TENNEY.